Figure 1:
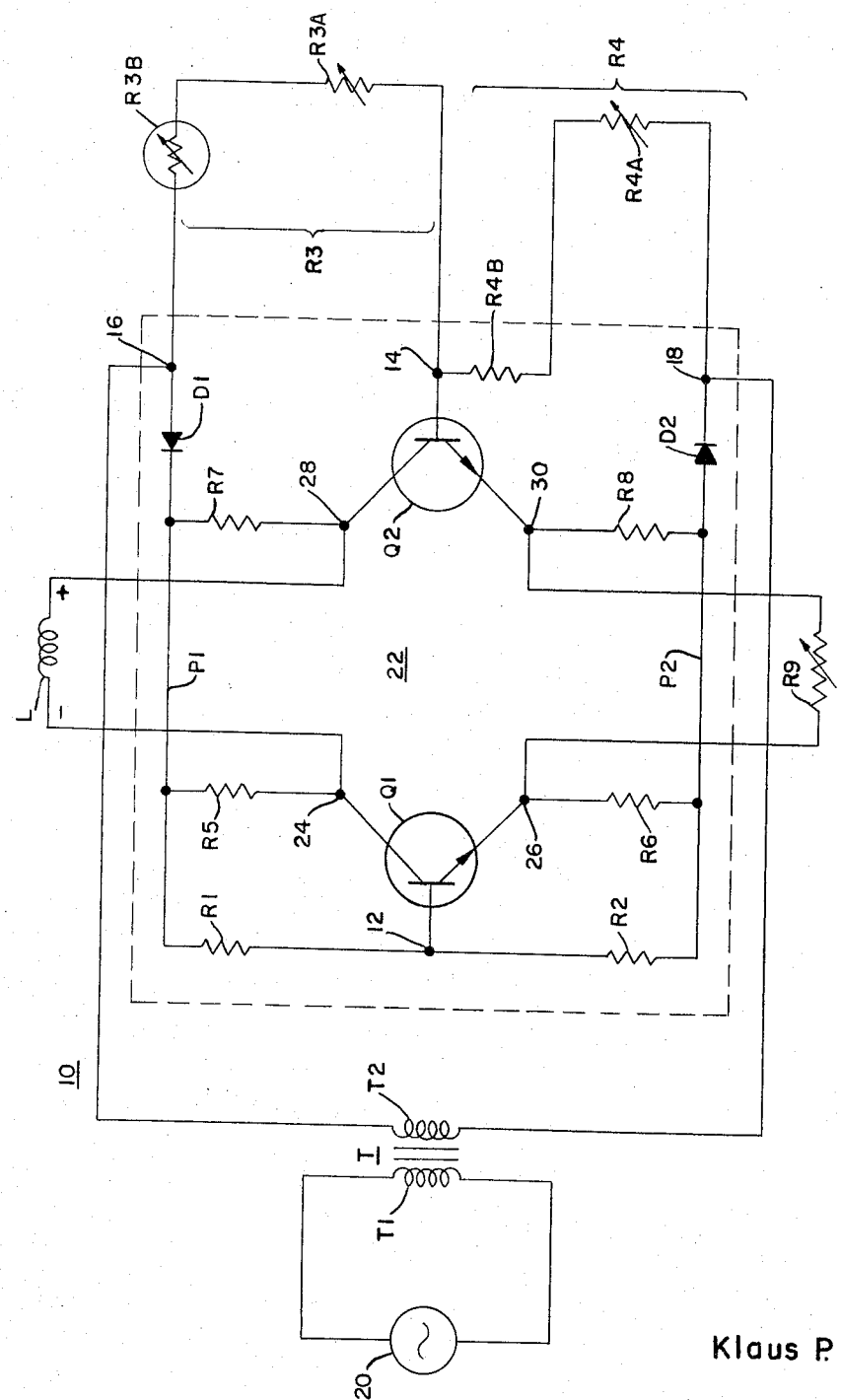

INVENTOR
Klaus P. Mueller
BY Birch and Birch
ATTORNEYS

United States Patent Office 3,360,715
Patented Dec. 26, 1967

3,360,715
CONDITION RESPONSIVE SOLID STATE TRANSDUCING AND INDICATING CONTROLLER MEANS
Klaus P. Mueller, Goshen, Ind., assignor to Robertshaw Controls Company, Richmond, Va., a corporation of Delaware
Filed July 19, 1965, Ser. No. 472,853
10 Claims. (Cl. 323—75)

This invention relates to solid state condition responsive circuit means and more particularly to new and novel solid state transducing circuit means, solid state indicating circuit means and new and novel combinations thereof.

It is an object of this invention to provide solid state transducing circuit means comprising a new and novel condition responsive resistance bridge and differential amplifier combination.

Another object of this invention is to provide solid state indicating circuit means comprising a new and novel condition responsive resistance bridge and differential amplfier combination.

Yet another object of this invention is to provide new and novel solid state indicating and transducing circuit means, both energized from a common alternating current power source, wherein alternate half cycles from said power source effect transducing duty cycles and the remaining half cycles from said power source effect indicating duty cycles.

These and other objects of the present invention will become more fully apparent with reference to the following specification and drawing which relate to some preferred embodiments of the invention.

Figure 2:
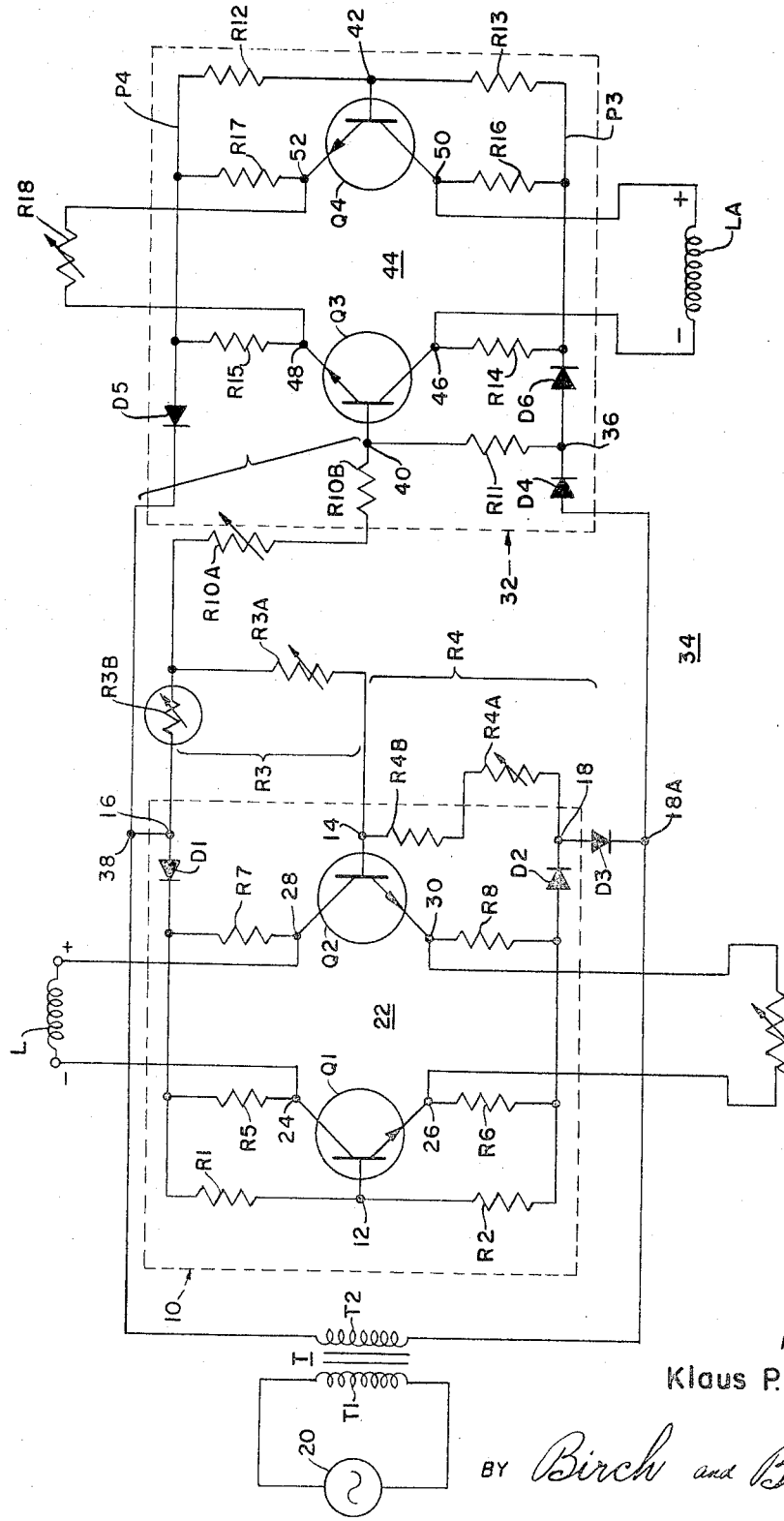

In the drawings:

FIGURE 1 is a schematic circuit diagram of a solid state transducer circuit of the present invention; and FIGURE 2 is a schematic diagram of combined solid state transducer and indicator circuits of the present invention.

Referring in detail to the drawings, and more particularly to FIGURE 1, a transducer circuit 10 is shown as including a four arm resistance bridge of the Wheatstone type having resistance arms R1, R2, R3 and R4.

The resistance arms R1 and R2 are fixed resistance reference arms having a common node 12 therebetween, the latter comprising a first output terminal of the resistance bridge.

The resistance arms R3 and R4 are sensing and zero setting variable resistance arms, respectively, having a common node 14 therebetween, the latter comprising a second output terminal of the resistance bridge. The resistance arm R3 comprises the sensing arm and includes a variable set point resistance R3A in series with a condition responsive variable resistance sensor R3B. The resistance arm R4 comprises a variable zero setting resistance R4A in series with a fixed resistance R4B.

The bridge input terminals comprise common circuit nodes 16 and 18 located, respectively, between resistance arms R1 and R3 and resistance arms R2 and R4. Alternating current power is supplied to the bridge input terminals 16 and 18 through a power transformer T having a secondary T2 connected across the said input terminals and having a primary T1 connected across a source of alternating current power 20.

The resistance arms R1 and R2 are energized during one half-cycle of the source 20 by first and second diodes D1 and D2 connected, respectively, between input terminal 16 and resistance arm R1 and between input terminal 18 and resistance arms R2, the anode-cathodes paths of the said diodes D1 and D2 being in series with the said resistance arms R1 and R2 and the said input terminals 16 and 18. The direction of conventional current flow is from terminal 16 to terminal 18 through the said diodes D1 and D2 as shown.

Both half-cycles of A.C. power from the source 20 energize the variable resistance arms R3 and R4.

The output terminals 12 and 14 of the resistance bridge R1–R2–R3–R4 comprise the input terminals of a solid state differential amplifier circuit 22 which includes, as its active elements, first and second transistors Q1 and Q2, respectively, of the NPN type. The output terminals 12 and 14 of the bridge circuit comprise the base terminals of the transistors Q1 and Q2, respectively.

A positive power lead P1 extends from the first diode D1 to the resistance arm R1 and a negative or common power lead P2 extends from the resistance arm R2 to the second diode D2 to provide the bias supply for the differential amplifier 22.

The first transistor Q1 includes a collector terminal 24 connected through a limiting resistance R5 to the positive power lead P1 and an emiter terminal 26 connected through a resistance R6 to the negative power lead P2.

The second transistor Q2 includes a collector terminal 28 connected through a limiting resistance R7 to the positive power lead P1 and an emitter terminal 30 connected through a resistance R8 to the negative power lead P2.

The emitter terminals 26 and 30 are interconnected with a variable resistance R9 which controls the gain of the differential amplifier circuit and hence, the proportional band of the transducer circuit 10 as will be hereinafter more fully described.

The output of the transducer circuit 10 and the differential amplifier 22 is taken across the collector terminals 24 and 28 through a suitable responsive load device L, shown as an inductance in the present embodiment such that, for example, a motion output may be derived from the differential amplifier 22 and transducer circuit 10 in response to a variation of the sensor resistance R3B in response to a variable input parameter such as temperature or humidity.

Referring now to FIGURE 2, the transducer circuit 10 is shown in combination with an indicator circuit 32, thereby comprising a continuous readout controller circuit 34.

The transducer circuit 10 in this embodiment is identical with that of FIGURE 1 except that the bridge input terminal 18 is connected through a third diode D3 with the secondary T2 of the power transformer T, the said diode D3 having the same anode-cathode orientation with respect to the resistance arms R1 and R2 as the first and second diodes D1 and D2 and being in series relationship therewith.

The cathode of the third diode D3 thus comprises a circuit node 18A which is connected with the transformer secondary T2 and connected through the anode-cathode path of a fourth diode D4 to a first input terminal 36 of a resistance bridge in the indicator circuit 32. The resistance bridge includes a second input terminal 38 which is electrically coincident with the circuit node 16 in the transducer circuit 10.

The resistance bridge in the indicator circuit 32 includes a sensor arm R10 extending from the input terminal 38 to a first output terminal 40; an adjacent fixed resistance arm R11 extending from the said output terminal 40 to the input terminal 36; a fixed resistance arm R12 connected from a second output terminal 42 to the input terminal 38 through the anode-cathode path of a fifth diode D5; and a fixed resistance arm R13 connected on one side from the input terminal 36 through anode-cathode path of a sixth diode D6 and on the other side to the second output terminal 42. The sensor arm R10 includes the sensor R3B of the resistance arm R3, an indicator zero setting resistance R10A and a fixed resistance R10B, all connected in series.

A second differential amplifier circuit 44 is connected across the output terminals 40 and 42 of the indicator circuit 32 and includes third and fourth transistors Q3 and Q4, respectively, of the NPN type having their base terminals respectively comprised of the output terminals 40 and 42.

The bias supply for the amplifier 44 comprises a positive power lead P3 extending from the cathode of the sixth diode D6 to the resistance arm R13 and a negative or common power lead P4 extending from the resistance arm R12 to the anode of the fifth diode D5.

The third transistor Q3 includes a collector terminal 46 connected through a limiting resistance R14 to the positive power lead P3 and an emitter terminal 48 connected through a resistance R15 to the negative power lead P4.

The fourth transistor Q4 includes a collector terminal 50 connected through a limiting resistance R16 to the positive power lead P3 and an emitter terminal 52 connected through a resistance R17 to the negative power lead P4.

The gain of the second differential amplifier 44 and hence, the indicating span of the circuit 32, is controlled by means of a variable resistance R18 connected between the emitter terminals 48 and 52. The control of gain and span will be hereinafter more fully described with reference to the operation of the embodiment of FIGURE 2.

The output of the second differential amplifier circuit 44 is taken across the collector terminals 46 and 50 and is applied to a load LA comprising the input coil of a suitable meter movement or the like.

OPERATION

Referring now to FIGURE 1, the operation of the transducer circuit 10 is as follows:

Assuming energization of the transformer T forms the A.C. power source 20, alternating current voltage appears across the input terminals or circuit nodes 16 and 18. Because of the presence of the rectifiers D1 and D2, half-wave rectification is effected with respect to the resistance arms R1 and R2, thus resulting in energization thereof on alternate half-cycles of the input and energization of the variable resistance arms R3 and R4 on every half-cycle. However, because of the polarity of the first and second transistors Q1 and Q2, an amplified differential output is only effected during the alternate half cycles in which the standard resistance arms R1 and R2 are energized in parallel with the variable resistance arms R3 and R4. Each energizing half cycle, because of the voltage dividing relationship of the resistance arms R1 and R2, will place a predetermined signal voltage at the bridge output terminal or base terminal 12 of the first transistor Q1, causing the said transistor Q1 to conduct in a predetermined proportional manner, whereby a first output voltage signal will appear at the collector 24 as a result of the collector-emitter current through the resistors R5 and R6. At the same time, depending upon the adjusted value of the set point esistance R3A, set point zero setting resistance R4A and the variable response of the sensor resistance R3B to the variation away from set point zero of the parameter being monitored, a condition responsive signal voltage will appear at the bridge output terminal or base terminal 14 of the second transistor Q4, causing the said transistor Q4 to conduct in a predetermined proportional manner, whereby a second output voltage signal will appear at the collector terminal 28 as a result of the collector-emitter current through the resistors R7 and R8.

If the resistances R5, R6, R7 and R8 of the differential amplifier 22 are all of equal value, then the pressure of a more positive output voltage signal at the collector 28 than at the collector 24 is an indication of a lesser degree of conduction (current flow) through the collector-emitter path 28–30 of the second transistor Q2 than through the collector-emitter path 24–26 of the first transistor Q1.

Now, in order to vary the response (proportional band) of the transducer load L to a given range of output voltage differentials, the proportional band resistance R9 is selectively varied with the result that the resistance in each emitter path will be varied as a function of the value of the resistance R9 and the self bias of each of the said transistors Q1 and Q2 will be varied in proportion to the current output of each at the respective emitter terminals 26 and 30. Thus the proportional response of each transistor Q1 and Q2 is varied as a function of its own input signal at the base terminals 12 and 14 respectively in response to a change in the proportional band resistance R9 and the span or magnitude of the output voltage differential of the amplifier 22 is varied accordingly. Thus, the response of the transducer load L is also varied for a given input voltage differential.

Referring now to FIGURE 2, the operation of this embodiment is as follows:

The third diode D3 permits only alternate half-cycles of input power from the transformer T to be applied to the entire transducer circuit 10, with the exception of the sensor resistance R3B as will hereinafter become readily apparent. Thus, alternate half-cycles of input power are utilized exclusively to perform a transducing function in the continuous readout controller circuit 34.

The remaining alternate half-cycles from the power transformer T are gated into the indicator circuit 32 via the fourth, fifth and sixth diodes D4, D5 and D6, respectively. Since the circuit node 16–38 is common to both transducer and indicator circuits 10 and 32 as well as the sensor resistance R3B, the said sensor R3B is (full-wave) energized by both alternate half cycles of the power input from the transformer T.

In similar manner to the transducer circuit 10, a first predetermined voltage input signal is effected at input terminal 42 via fixed resistance arms R12 and R13 causing a first voltage output signal to appear at the collector terminal 50 of the fourth transistor Q4. At the same time, a second voltage input signal is effected at the input terminal 40 as a function of the response of the input sensor R3B to the monitored parameter of the controller circuit 34, resulting in a second output voltage signal at the collector 46 of the third transistor Q3 which is a function of the parameter being monitored. Thus, a second differential output voltage signal is effected across the collectors 46 and 50, whereby the indicator load LA is energized as a function of the value of the parameter being monitored.

The gain or span of the indicator circuit 32 in response to variations in the monitored parameter is selectively controlled by the indicator span resistance R18 in the manner previously defined for the transducer span resistance R9.

The sixth diode D6 has been included in the indicator circuit 32 to illustrate the proper connection for a compensating ambient temperature characteristic diode should such be necessary for the fourth diode D4. Because of the symmetry of the transducer and indicating circuits 10 and 32 in the controller circuit 34, the proper locations of other such diodes, when necessary should now be readily apparent to those having ordinary skill in the art.

As can be readily seen from the foregoing specification and drawings, this invention provides new and novel transducer and indicator circuits, respectively, which are characterized by their simplicity and versatility as to zero point, set point, proportional band and span adjustment in a given control situation for a monitored system parameter.

Further, the present invention provides a continuous readout controller circuit, in which a full-wave power input is constrained to provide a first train of alternate half-cycle power pulses for effecting a transducing function for a monitored system parameter and a second train of alternate half-cycle power pulses for effecting an indicating function for the said parameter. Thus, a time sharing transducing-indicating function is performed.

It is to be understood that the preferred embodiments shown and described herein are for the purpose of example and are not intended to limit the scope of the appended claims.

What is claimed is:

1. Circuit means providing an output voltage signal as a function of the variation of a monitored parameter from a predetermined control point comprising a source of alternating current power; a resistance bridge having input terminals connected across said source, a first pair of series connected constant resistance bridge arms, having a first output terminal therebetween maintained at a predetermined potential, connected across said input terminals through half-wave rectifier means, a second pair of series connected variable resistance bridge arms including a variable resistance sensor means having the resistance thereof variable as a function of a monitored parameter and having a second output terminal therebetween having a variable potential thereon as a function of changes in said parameter, connected across said input terminals; and differential amplifier means having inputs connected respectively, at said output terminals of said resistance bridge, said differential amplifier means including means providing an output voltage signal proportional to the unbalance in said bridge circuit as a function of the said variations in said parameter during each alternate half cycle of power supplied to said bridge.

2. The invention defined in claim 1, wherein said pair of series connected variable resistance arms comprises a first arm including said variable resistance sensor means and a variable set point resistance in series therewith and a second arm including a variable resistance means effecting an operating zero for said set point such that when said parameter is constrained at said operating zero the voltage signals at said bridge output terminals will be equal and said bridge will be balanced.

3. The invention defined in claim 1, wherein said differential amplifier means comprises first and second transistor means each having base, collector and emitter terminals, said base terminals comprising the inputs of said amplifier means and being connected one at each of said bridge output terminals, said emitter terminals being resistance coupled to one side of said first pair of bridge arms, said collector terminals being resistance coupled to the other side of said first pair of bridge arms, said output means of said amplifier means comprising a load impedance interconnecting said collector terminals, and selectively variable resistance means interconnecting said emitter terminals effecting a selectively variable gain in said amplifier means.

4. The invention defined in claim 1, wherein said pair of series connected variable resistance arms comprises a first arm including said variable resistance sensor means and a variable set point resistance in series therewith and a second arm including a variable resistance means effecting an operating zero for said set point such that when said parameter is constrained at said operating zero the voltage signals at said bridge output terminals will be equal and said bridge will be balanced; and wherein said differential amplifier means comprises first and second transistor means each having base, collector and emitter terminals, said base terminals comprising the inputs of said amplifier means and being connected one at each of said bridge output terminals, said emitter terminals being resistance coupled to one side of said first pair of bridge arms, said collector terminals being resistance coupled to the other side of said first pair of bridge arms, said output means of said amplifier means comprising a load impedance interconnecting said collector terminals, and selectively variable resistance means interconnecting said emitter terminals effecting a selectively variable gain in said amplifier means.

5. Circuit means providing continuous control output voltage signals and continuous readout output voltage signals on a time sharing basis as a function of the variation of a controlled and monitored system parameter comprising a source of alternating current power; first and second resistance bridge means having first and second sets of input terminals, respectively, connected across said source, said first and second bridge means including first and second pairs of bridge output terminals, respectively; and first and second differential amplifier means connected, respectively, across said first and second pairs of output terminals and respectively including control and readout output means; said first and second bridge means including, respectively, selective means effecting energization of said first and second differential amplifier means and the respective control and readout output means thereof during respectively alternate half-cycles of the alternating current power from said source.

6. The invention defined in claim 5, wherein said selective means comprises first and second half-wave rectifier means located, respectively, in said first and second resistance bridge means across the said first and second pairs of input terminals; and wherein said each of said bridge means comprises a first pair of series connected resistance arms, having a one of said bridge output terminals therebetween, in series with said half-wave rectifier means, and a second pair of series connected variable resistance arms, having the other of said bridge output terminals therebetween, one of said second pair of arms including a variable resistance sensor means having the resistance thereof variable as a function of a monitored parameter, said sensor means being commonly connected in the corresponding bridge arm of both said bridge means, whereby the respective outputs of said bridge means and said differential amplifier means are all a function of the parameter being monitored by said circuit means.

7. The invention defined in claim 6, wherein, in each of said resistance bridge means, said pair of series connected variable resistance arms comprises a first arm including said variable resistance sensor means and a variable set point resistance in series therewith and a second arm including a variable resistance means effecting an operating zero for said set point such that when said parameter is constrained at said operating zero the voltage signals at said bridge output terminals will be equal and said bridge will be balanced.

8. The invention defined in claim 5, wherein each of said differential amplifier means comprises first and second transistor means each having base, collector and emitter terminals, said base terminals comprising the inputs of said amplifier means and being connected one at each of said bridge output terminals of the respectively associated bridge means, said emitter terminals being resistance coupled to one side of said first pair of bridge arms, said collector terminals being resistance coupled to the other side of said first pair of bridge arms, said output means of each said amplifier means comprising a load impedance interconnecting said collector terminals, and selectively variable resistance means interconnecting said emitter terminals effecting a selectively variable gain in each said amplifier means.

9. The invention defined in claim 5, wherein said selective means comprises first and second half-wave rectifier means located, respectively, in said first and second resistance bridge means across the said first and second pairs of input terminals; and wherein said each of said bridge means comprises a first pair of series connected resistance arms, having a one of said bridge output terminals therebetween, in series with said half-wave rectifier means, and a second pair of series connected variable resistance arms, having the other of said bridge output terminals therebetween, one of said second pair of arms including a variable resistance sensor means having the resistance thereof variable as a function of a monitored parameter, said sensor means being commonly connected in the corresponding bridge arm of both said bridge means, whereby the respective outputs of said bridge means and said differential amplifier means are all a function of the parameter being monitored by said circuit means; and wherein each of said differential amplifier means comprises first and second transistor means each having base, collector and emitter terminals, said base terminals comprising the inputs of said amplifier means and being connected one at each of said bridge output terminals of the respectively associated bridge means, said emitter terminals being resistance coupled to one side of said first pair of bridge arms, said collector terminals being resistance coupled to the other side of said first pair of bridge arms, said output means of each said amplifier means comprising a load impedance interconnecting said collector terminals, and selectively variable resistance means interconnecting said emitter terminals effecting a selectively variable gain in each said amplifier means.

10. The invention defined in claim 9, wherein, in each of said resistance bridge means, said pair of series connected variable resistance arms comprises a first arm including said variable resistance sensor means and a variable set point resistance in series therewith and a second arm including a variable resistance means effecting an operating zero for said set point such that when said parameter is constrained at said operating zero the voltage signals at said bridge output terminals will be equal and said bridge will be balanced.

References Cited

UNITED STATES PATENTS

| | | | |
|---|---|---|---|
| 2,600,051 | 6/1952 | Fay et al. | 323—75 X |
| 2,715,718 | 8/1955 | Holtje | 340—149 |
| 3,048,778 | 8/1962 | Rumpel | 324—95 |

JOHN F. COUCH, *Primary Examiner.*

W. E. RAY, *Assistant Examiner.*